United States Patent
Linardi et al.

(10) Patent No.: US 7,552,973 B2
(45) Date of Patent: Jun. 30, 2009

(54) RETRACTABLE HEADREST

(75) Inventors: Matthieu Linardi, Gentilly (FR); Fabrice Lesbats, Sucy En Brie (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 12/004,104

(22) Filed: Dec. 19, 2007

(65) Prior Publication Data

US 2008/0211267 A1  Sep. 4, 2008

(30) Foreign Application Priority Data

Dec. 22, 2006  (FR) .................................. 06 55898

(51) Int. Cl.
*B60N 2/48* (2006.01)
(52) U.S. Cl. ...................... 297/408; 297/410
(58) Field of Classification Search ................. 297/408, 297/410
See application file for complete search history.

(56) References Cited

U.S. PATENT DOCUMENTS

| 6,074,010 | A | 6/2000 | Takeda | |
|---|---|---|---|---|
| 6,299,254 | B1 * | 10/2001 | Dinh et al. | 297/408 |
| 7,044,555 | B2 * | 5/2006 | Saberan | 297/408 |
| 7,070,240 | B2 * | 7/2006 | Schmitt et al. | 297/408 X |
| 2003/0098596 | A1 | 5/2003 | Andreasson et al. | |

FOREIGN PATENT DOCUMENTS

| DE | 103 19 453 B3 | 6/2004 |
| DE | 10 2004 040 885 B3 | 9/2005 |
| DE | 10 2004 027 385 A1 | 12/2005 |

OTHER PUBLICATIONS

French Search Report dated Jul. 24, 2007.

* cited by examiner

*Primary Examiner*—Anthony D Barfield
(74) *Attorney, Agent, or Firm*—Howard IP Law Group, PC

(57) ABSTRACT

A headrest for a seat back for a seat back of an automobile vehicle seat, comprising a rod, likely to be at least party driven into the seat back, and a body linked to the rod. The rod is linked to a lower portion of the body by a pivoting link and the headrest comprises means, triggered by a driving of the rod into the seat back down to a driving-in position, capable of automatically pivoting the body with respect to the rod from a use position to a non-use position.

7 Claims, 3 Drawing Sheets

RETRACTABLE HEADREST

FIELD OF THE INVENTION

The present invention generally relates to a headrest for an automobile vehicle seat.

DISCUSSION OF THE RELATED ART

FIG. 1 schematically shows a conventional automobile vehicle seat 10 comprising a seat bottom 12 and a seat back 14. Seat back 14 is pivotally linked to seat bottom 12 via a linkage system 16. Further, seat 10 comprises a headrest 20 linked to seat back 14.

As an example, a comma-type headrest 20 which is formed of a body 22 comprising a rigid armature generally covered with lining and contained in a cover, body 22 being linked to seat back 14 by two pins 23. The position of body 22 with respect to seat back 14 can be modified by driving pins 23 more or less into seat back 14. As compared with a conventional seat back, body 22 has a reduced thickness and exhibits, in cross-section, the general shape of an upside down L. An advantage of such a headrest 20 is its low manufacturing cost and its low bulk.

It would generally be desirable, when a back seat is not occupied by a user, to be able to bring headrest 20 of this seat from a normal use position to a non-use position which improves the driver's visibility towards the back of the vehicle, or retrovision. The security constraints relative to automobile vehicle seats are determined by many standards. As an example, US standard FMVSS202a provides, in the case where the height of seat back 14 and of headrest 20 is smaller than 750 millimeters when headrest 20 is brought as close as possible to seat back 14, that headrest 20 must be able to be manually pivoted by plus or minus 60 degrees with respect to seat back 14 in a position where it is not used. In Europe, the current tendency tends to advocate that, when headrest 20 is in a non-use position, it must be a discomfort for a user who would attempt to sit in the seat.

It would also be desirable to be able to bring seat back 14 from a normal use position to a so-called "tilted" position in which seat back 14 is completely tilted against seat bottom 12, for example, so that the rear surface of seat back 14 forms a substantially planar surface. Headrest 20 must not obstruct the pivoting of seat back 14 on passing from the normal seat back use position to the tilted position, be headrest 20 in normal use position or in non-use position. In particular, headrest 20 must not knock, during the pivoting of seat back 14, against other vehicle elements such as, for example, the front seats. Further, at the end of the pivoting of seat back 14, the bulk of headrest 20 must be as small as possible in particular if headrest 20 comes into contact with seat bottom 12.

Document DE 10219453 describes a device for pivoting a comma-type headrest from a normal use position to a non-use position. However, the device described in this document does not enable bringing the headrest to a non-use position which improves the driver's visibility towards the back of the vehicle when the headrest is arranged at the level of a back seat.

SUMMARY OF THE INVENTION

The present invention aims at providing a headrest, for example, an automobile vehicle seat headrest likely to be brought to a non-use position, to improve the driver's backward visibility, when a user brings the headrest closer to the seat back.

According to an aspect, the headrest enables tilting of the seat back against the seat bottom when in non-use position.

According to another aspect, the headrest enables satisfying the previously described US standard FMVSS202a and European tendency.

According to another aspect, the headrest is of relatively simple design.

According to another aspect, the headrest may be provided with a reduced cost.

An exemplary embodiment of the present invention provides a headrest for a seat back of an automobile vehicle seat, comprising a rod, likely to be at least partly driven into the seat back, and a body linked to the rod. The rod comprises two pins linked to the seat back, each pin extending in a bent portion. The rod further comprises a U-shaped portion having its ends connected to the bent portions. A lower portion of the body is linked to the U-shaped portion by a pivoting link. The headrest comprises means, triggered by a driving of the rod into the seat back to a driving-in position, capable of automatically pivoting the body with respect to the rod from a use position to a non-use position.

According to an embodiment, the headrest comprises elastic return means linked to the body and capable of exerting an urge on the rod which tends to pivot the body with respect to the rod to bring the body to the non-use position from the use position.

According to an embodiment, the headrest comprises means for locking the body to the rod in the use position.

According to an embodiment, the headrest comprises a hook attached to the body, the locking means being assembled to be able to move with respect to the rod between a first position at which the hook cooperates with the locking means and a second position at which the hook is released from the locking means.

According to an embodiment, the headrest comprises urging means capable of permanently exerting an urge on the locking means which tends to displace it towards the first position and the locking means comprises a bearing surface likely to come into contact with the seat back when the rod is driven into the seat back down to said driving-in position, the seat back then exerting an urge on the locking means which tends to displace it to the second position.

According to an embodiment, the headrest comprises a shell covering the bent portions, the locking means being partly contained in the shell.

According to an embodiment, the body has, in side cross-section view, the shape of an upside down L, the rod being linked to the lower end of the body by the pivoting link.

According to an embodiment, the body has, in side cross-section view, the shape of a quadrilateral, the rod being linked to the base of the body by the pivoting link.

An embodiment of the present invention also provides an automobile vehicle seat comprising a headrest such as previously defined.

The foregoing and other aspects, features, and advantages of embodiments of the invention will be discussed in detail in the following non-limiting description of specific embodiments in connection with the accompanying drawings.

DETAILED DESCRIPTION

Figure 1:
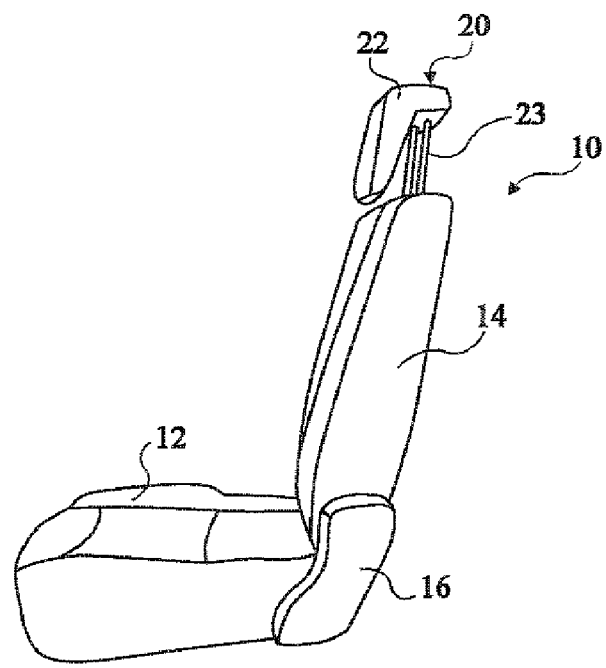
FIG. 1, previously described, very schematically shows an example of an automobile vehicle seat.

For clarity, the same elements have been designated with the same reference numerals in the different drawings. In the following description, terms "front" and "rear" are used with respect to the longitudinal direction of the vehicle. Further, terms "lower" or "bottom" and "upper" or "top" are used with respect to the direction perpendicular to the longitudinal and transverse vehicle directions which, as an example, corresponds to the vertical direction in the following description.

Figure 2:
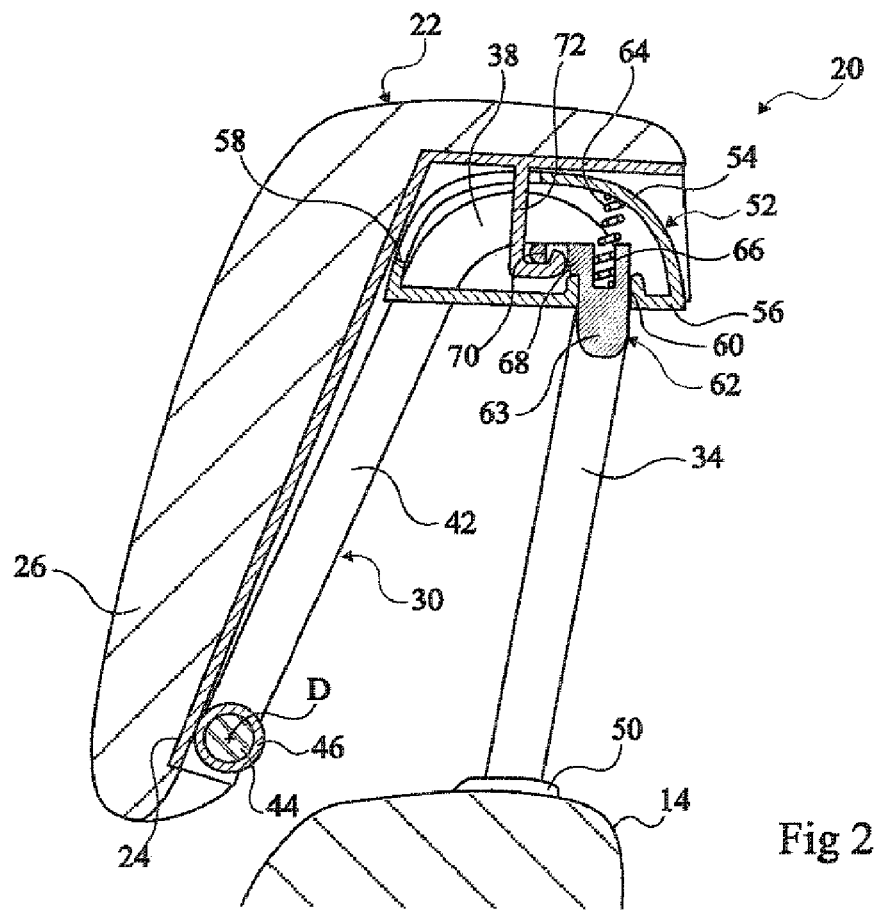
FIG. 2 is a simplified cross-section view of an embodiment of a headrest according to an embodiment of the invention in normal use position.

FIG. 2 is a simplified cross-section view of an embodiment of headrest 20. The cross-section is drawn in a vertical plane substantially corresponding to a plane of symmetry of headrest 20. Body 22 is formed of a rigid armature 24, for example, made of plastic matter, at the level of which is arranged lining 26. Armature 24 has, in the cross-sectional plane, the general shape of an upside down L. Body 22 may further be covered with a cap, not shown. Body 22 is movably assembled at the level of an insert 30.

Figure 3:
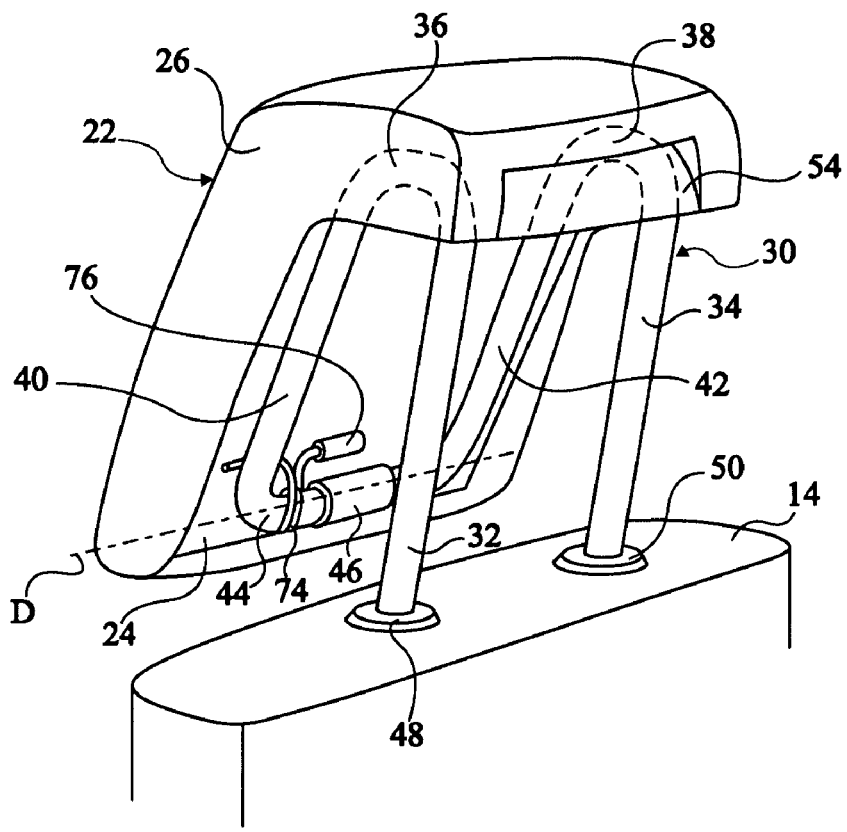
FIG. 3 is a perspective back three-quarter view of the headrest of FIG. 2 in normal use position.

FIG. 3 is a back ¾ perspective view of headrest 20 of FIG. 2, the non-visible portions of insert 30 being shown in dotted lines. Insert 30 has a substantially symmetrical structure and comprises two pins 32, 34 by means of which insert 30 is connected to seat back 14. Each pin 32, 34 extends in a bent portion 36, 38 which itself extends in a downward-oriented branch 40, 42. Branches 40, 42 join by a central branch 44 oriented along the transverse direction of the vehicle. Armature 24 comprises a bearing 46 receiving central branch 44 so that it can rotate around a transverse axis D. Blocking elements 48, 50 enable blocking pins 32, 34 in their position with respect to seat back 14.

Headrest 20 comprises a shell 52 having a bulged wall 54 in the shape of a half-cylinder closed by a planar wall 56. Shell 52 is attached to insert 30 at the level of bent portions 36, 38, with bulged portion 54 covering bent portions 36, 38. Openings, not visible, are provided in shell 52 to enable passing of insert 30. Bulged wall 54 comprises an opening 58 oriented towards the front of the vehicle and planar wall 56 comprises a circular opening 60 (visible in FIG. 2). A push-button 62 is partially arranged in shell 52 at the level of opening 60. Push-button 62 comprises a cylindrical portion 63 capable of sliding in opening 60. A spring 64 is arranged in shell 52 and comprises an end bearing against bulged wall 54 and another end housed in an internal opening 66 of cylindrical portion 63. Push-button 62 comprises a protruding portion 68 which projects from cylindrical portion 63 on the side of the internal volume of shell 52. Protruding portion 68 is ring shaped and comprises an internal opening 70. Spring 64 exerts a pressure on push-button 62 so that, in the absence of external actions, push-button 62 slides in opening 60 until protruding portion 68 stops against the edges of opening 60. One end of cylindrical portion 63 then projects outside of shell 52 on the side of planar wall 56.

Headrest 20 comprises a hook 72, visible in FIG. 2, fixedly attached to armature 24. A torsion spring 74, visible in FIG. 3, comprises an end attached to armature 24 by an attachment element 76. The opposite end of spring 74 bears against insert 30. Spring 74 tends to pivot body 22 with respect to insert 30 counterclockwise in FIG. 2.

FIG. 2 shows headrest 20 in a normal use position. In this position, rigid body 22 is tilted against insert 30 and is attached to insert 30 by means of hook 72 having its end maintained in opening 70 of push-button 62. Hook 72 penetrates into shell 52 via opening 58 provided in bulged wall 54.

Figure 4:
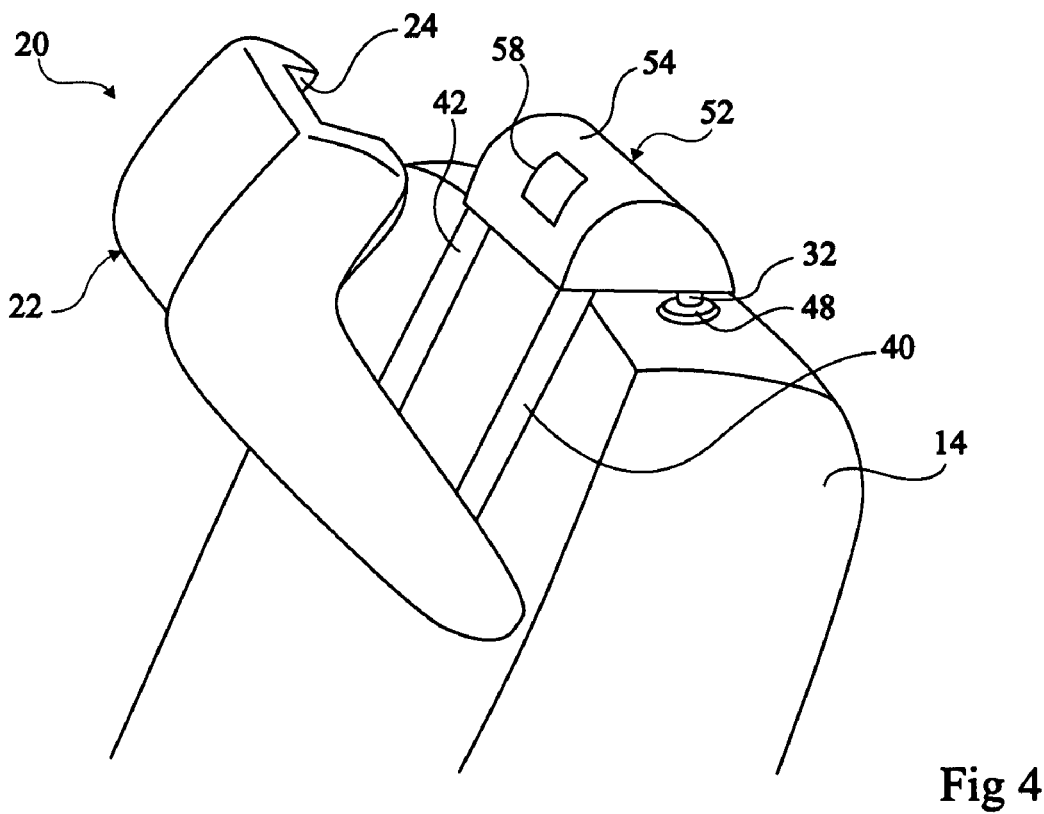
FIG. 4 is a perspective front three quarter view of the headrest of FIG. 2 in non-use position.

FIG. 4 shows headrest 20 in a non-use position. In this position, pins 32, 34 are driven as far as possible into seat back 14, with shell 52 resting on the upper end of seat back 14, and body 22 has pivoted towards the front with respect to insert 30. The pivoting of body 22 has been made possible due to the fact that the end of cylindrical portion 63 of push-button 62, which projects outside of shell 52, bears against seat back 14. This has caused a sliding of push-button 62 in opening 60 under the action of seat back 14 which opposes to the action of spring 64. The displacement of push-button 62 has released the end of hook 72 of opening 70, enabling pivoting of body 22 with respect to insert 30 around axis D under the action of torsion spring 74.

Figure 5A:
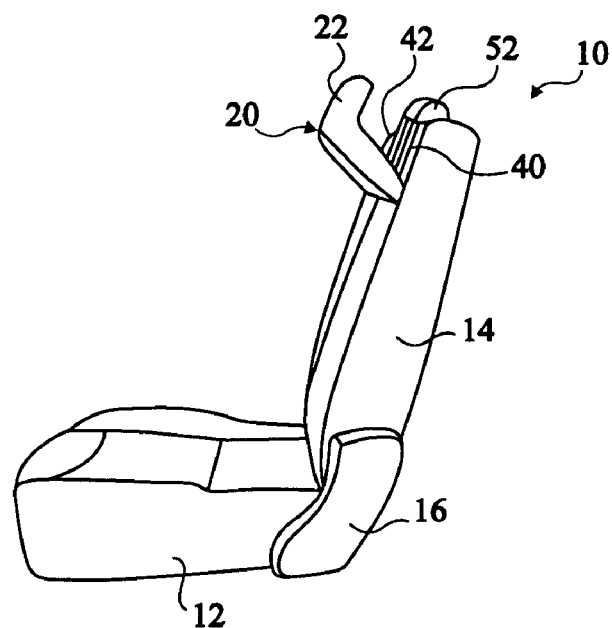
FIGS. 5A to 5C show an automobile vehicle seat provided with the headrest of FIG. 2 in three different positions.
Figure 5B:
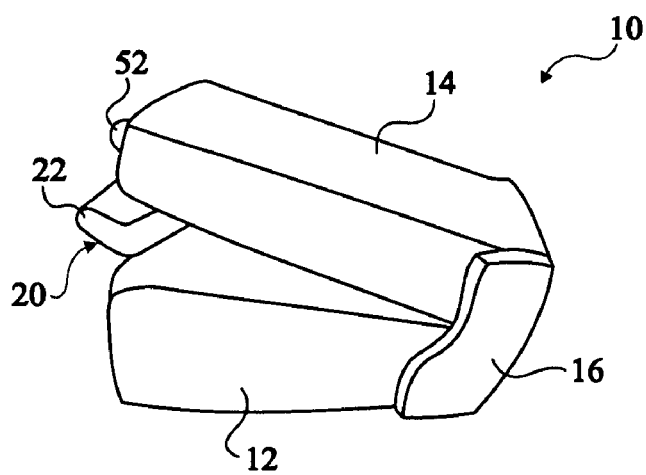
Figure 5C:
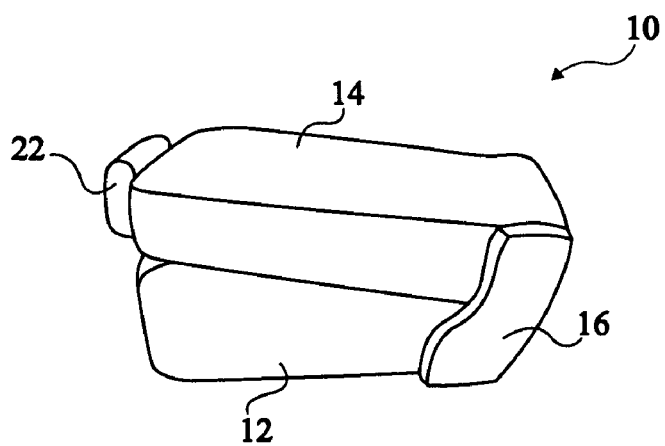

FIGS. 5A to 5C show seat 10 in three different positions.

When a user wants to bring the headrest from the normal use position, shown in FIG. 1, to the non-use position, for example to improve the retrovision, it unlocks blocking elements 48, 50 and presses on headrest 20. Pins 32, 34 are then driven into seat back 14 to bring headrest 20 closer to seat back 14 until push-button 62 comes into contact with seat back 14 and is driven into shell 52 under the action of seat back 14. This releases hook 72 and automatically causes the pivoting of body 22 with respect to insert 30 towards the front of the vehicle, that is, counterclockwise in FIG. 2. Headrest 20 is then in the non-use position shown in FIG. 5A. Alternatively, blocking elements 48, 50 are not present and a driving of pins 32, 34 into seat back 14 may be simply obtained by pressing on headrest 20. According to another variation, the unlocking of blocking elements 48, 50 may be obtained by the actuating of a single control button.

To bring headrest 20 from the non-use position of the normal use position, the user extracts pins 32, 34 from seat back 14, possibly by an unlocking of blocking elements 48, 50 until push-button 62 is no longer in contact with seat back 14. Push-button 62 is then maintained against opening 60 of planar portion 56 under the action of spring 64. The user can then manually pivot rigid body 22 towards the back of the vehicle, that is, clockwise in FIG. 5A. Hook 72 then penetrates into opening 58 of shell 52 and comes into contact with push-button 62. The shape of the end of hook 72 cooperates with protruding portion 68 of push-button 62 and causes a slight sliding of push-button 62 into shell 52 until hook 72 penetrates into opening 70 of push-button 62. Rigid body 22 is then blocked in position with respect to insert 30.

According to a variation, the driving of pins 32, 34 into seat back 14 may be performed by actuators, for example, electric motors. In this case, the user may actuate a control which causes the driving of pins 32, 34 into seat back 14 to bring headrest 20 to a non-use position.

When a user wants to bring seat back 14 from the normal use position to the tilted position, he can first bring headrest 20 to the non-use position shown in FIG. 5A. The user then actuates a control, for example, located at the level of linkage 16, enabling pivoting seat back 14 to tilt it against seat bottom 12. Seat back 14 pivots until seat bottom 12 comes into contact with body 22. The seat then is in the position shown in FIG. 5B. The action of seat bottom 12 on body 22 opposes to the action of spring 74 and pivots the headrest clockwise in FIG. 5B until rigid body 22 reaches a low bulk position shown in FIG. 5C. The seat back then is in tilted position. The pivoting of body 22 enables bringing seat back 14 as close as possible to seat bottom 12. In low bulk position, body 22 may have sufficiently pivoted backwards so that hook 72 has penetrated into shell 52. However, with push-button 62 still bearing against seat back 14, hook 72 cannot cooperate with opening 70 of push-button 62. Thereby, when the user brings seat back 14 from the tilted position to the normal seat back use position, body 22 is automatically brought back, under the action of spring 74, to the non-use position. Thus, when a user tilts seat back 14 against seat bottom 12 while headrest 20 is in non-use position, headrest 20 automatically returns to the non-use position when the user brings seat back 14 back to the normal seat back use position.

According to a variation, the control used to enable pivoting of seat back 14 with respect to seat bottom 12 also unlocks blocking elements 48, 50 to enable driving of pins 32, 34 into seat back 14. According to another variation, the driving of pins 32, 34 into seat back 14 and the pivoting of seat back 14 may be performed by actuators, for example, electric motors. In this case, the user can actuate a control which causes the pivoting of seat back 14, and which causes, before the pivoting or during the pivoting of seat back 14, the driving of pins 32, 34 into seat back 14 to bring headrest 20 to a non-use position.

The embodiments of the invention have many advantages.

First, when a user brings headrest 20 as close as possible to seat back 14, headrest 20 is automatically displaced to the non-use position.

Second, in non-use position, rigid body 22 of headrest 20 is inclined towards the front of the vehicle. This enables satisfying US standard FMVSS202a and the European tendency.

Third, when headrest 20 is in the non-use position and a user tilts seat back 14 against seat bottom 12, rigid body 22 of headrest 20 is automatically displaced towards the low bulk position to avoid obstructing the bringing of seat back 14 against seat bottom 12.

Of course, the present invention is likely to have various alterations, modifications, and improvements which will readily occur to those skilled in the art. In particular, although a use of the headrest for a vehicle back seat has been previously described, it should be clear that the disclosed headrest may be used with a vehicle front seat, the non-use position then enabling improving the forward vision of a back passenger. Further, although in the previously-described embodiment, insert 30 is linked to seat back 14 by two pins 32, 34, but it should be clear that the structure of insert 30 may be different. In particular, insert 30 may be linked to seat back 14 by a single rod, of circular, rectangular, etc. cross-section.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A headrest for a seat back of an automobile vehicle seat, comprising
   a rod adapted to be at least partly driven into the seat back, and
   a body linked to the rod,
   wherein the rod comprises:
      first and second pins linked to the seat back, each of said first and second pins extending in a first and a second bent portion,
      a U-shaped portion having its ends connected to the first and second bent portions,
      a lower portion of the body being linked to the U-shaped portion by a pivoting link, and
   wherein the headrest further comprises:
   means, triggered by a driving of the rod into the seat back to a driving-in position, capable of automatically pivoting the body with respect to the rod from a use position to a non-use position;
   locking means for locking the body to the rod in a use position; and
   a shell covering the first and second bent portions in the use position and in a non-use position,
   wherein the locking means is partly contained in the shell.

2. The headrest of claim 1, further comprising elastic return means linked to the body and capable of exerting an urge on the rod which tends to pivot the body with respect to the rod to bring the body to the non-use position from the use position.

3. The headrest of claim 1, further comprising a hook attached to the body, wherein the locking means is assembled to be able to move with respect to the rod between a first position at which the hook cooperates with the locking means and a second position at which the hook is released from the locking means.

4. The headrest of claim 3, further comprising urging means capable of permanently exerting an urge on the locking means which tends to displace it towards the first position and in which the locking means comprise a bearing surface likely to come into contact with the seat back when the rod is driven into the seat back down to said driving-in position, the seat back then exerting an urge on the locking means which tends to displace it to the second position.

5. The headrest of claim 1, wherein the body has, in cross-section side view, the shape of an upside down L, the rod being linked to the lower end of the body by the pivoting link.

6. The headrest of claim 1, wherein the shell is detachable from the body in the non-use position.

7. An automobile vehicle seat comprising a headrest, said headrest comprising:
   a rod adapted to be at least partly driven into the seat back, and
   a body linked to the rod,
   wherein the rod comprises:
      first and second pins linked to the seat back, each of said first and second pins extending in a first and a second bent portion;
      a U-shaped portion having its ends connected to the first and second bent portions;
      a lower portion of the body being linked to the U-shaped portion by a pivoting link; and
   wherein the headrest further comprises:
   means, triggered by a driving of the rod into the seat back to a driving-in position, capable of automatically pivoting the body with respect to the rod from a use position to a non-use position;
   locking means for locking the body to the rod in a use position; and
   a shell covering the first and second bent portions in the use osition and in a non-use position,
   wherein the locking means is partly contained in the shell.

* * * * *

UNITED STATES PATENT AND TRADEMARK OFFICE
CERTIFICATE OF CORRECTION

PATENT NO. : 7,552,973 B2
APPLICATION NO. : 12/004104
DATED : June 30, 2009
INVENTOR(S) : Matthieu Linardi and Fabrice Lesbats Page 1 of 1

It is certified that error appears in the above-identified patent and that said Letters Patent is hereby corrected as shown below:

Column 6, claim 7, line 61 change "osition" to --position--.

Signed and Sealed this

Twenty-fifth Day of August, 2009

David J. Kappos
*Director of the United States Patent and Trademark Office*